United States Patent
Wayland et al.

(10) Patent No.: US 7,507,786 B2
(45) Date of Patent: Mar. 24, 2009

(54) DECOLORIZATION OF OLIGOMERS

(75) Inventors: Bradford B. Wayland, Philadelphia, PA (US); Zhi Lu, Phillipsburg, NJ (US); Alexei A. Gridnev, Wilmington, DE (US); Thomas Robert Darling, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 24 days.

(21) Appl. No.: 11/595,449

(22) Filed: Nov. 9, 2006

(65) Prior Publication Data

US 2007/0191523 A1  Aug. 16, 2007

Related U.S. Application Data

(60) Provisional application No. 60/735,956, filed on Nov. 10, 2005.

(51) Int. Cl.
*C08F 6/00* (2006.01)
*C08F 4/80* (2006.01)

(52) U.S. Cl. ...................................... 528/482; 526/172

(58) Field of Classification Search ................. 528/482; 526/172
See application file for complete search history.

(56) References Cited

U.S. PATENT DOCUMENTS

| 5,726,263 | A | 3/1998 | Gridnev |
| 5,750,772 | A | 5/1998 | Gridnev |
| 2006/0270815 | A1 | 11/2006 | Ittel et al. |

FOREIGN PATENT DOCUMENTS

| WO | WO 00/50467 | 8/2000 |
| WO | WO 2005/090414 A1 | 9/2005 |

OTHER PUBLICATIONS

Gridnev, A., et al., "Catalytic Chain Transfer In Free Radical Polymerization", Chem. Rev. (2001), 101, pp. 3611-3659.
PCT International Search Report and Written Opinion for International Application No. PCT/US2006/043942 dated Apr. 18, 2007.

*Primary Examiner*—Fred M Teskin
(74) *Attorney, Agent, or Firm*—Gann G. Xu

(57) ABSTRACT

Methods of producing decolorized homo- and co-polymers through polymerization of monomers in presence of cobalt-complexed tetraphenyl porphyrin derivatives and decolorization of the produced polymer by exposing the polymer to a sorbent and, optionally, a solvent are disclosed herein.

10 Claims, 1 Drawing Sheet

TAP  →  TAPS₄

DECOLORIZATION OF OLIGOMERS

CROSS-REFERENCE TO RELATED APPLICATION

This application claims priority under 35 U.S.C. §119 from U.S. Provisional Application Ser. No. 60/735,956, filed Nov. 10, 2005.

FIELD OF THE INVENTION

This invention relates to a process for making colorless oligomers using a catalytic chain transfer catalyst/sorbent combination.

BACKGROUND OF THE INVENTION

Making oligomers by catalytic chain transfer (CCT) is inexpensive and technologically convenient. One problem with CCT, however, is removal of the CCT catalyst from the final product. Since current CCT catalysts are based on cobalt chelates, the CCT catalysts are inherently colored. This color cannot be tolerated by some oligomers such as those designed for use in clearcoats.

One solution is to pass the reaction mixture through sorbents (see U.S. Pat. Nos. 5,726,263 and 5,750,772). This approach, however, requires addition of at least 50% more additional solvent. This solvent must be removed later. Thus, the dilution adds additional cost to the process.

There remains a need for making colorless oligomers through CCT in a convenient and inexpensive way.

SUMMARY OF THE INVENTION

This invention provides a method of producing decolorized homo- and co-polymers comprising:
(a) polymerizing at least one monomer in the presence of a cobalt-complexed tetraphenyl porphyrin derivative; and
(b) decolorizing the polymer produced by step (a) by exposing the polymer to a sorbent and, optionally, a solvent.

In a preferred embodiment, the tetraphenyl porphyrin derivative has the formula

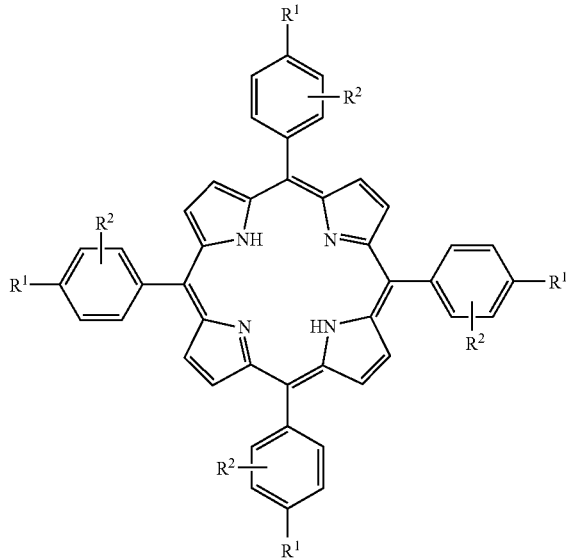

wherein each $R^1$ and $R^2$ is, independently, hydrogen, alkyl or branched alkyl $C_1$-$C_{12}$, hydroxyl, alkoxy, sulfonate, carboxylate, or phosphonate; provided that at least one $R^1$ or $R^2$ is sulfonate, carboxylate, or phosphonate. Preferably, each $R^1$ is methoxy and each $R^2$ is sulfonate.

Other objects and advantages of the present invention will become apparent to those skilled in the art upon reference to the detailed description that hereinafter follows.

DETAILED DESCRIPTION OF THE INVENTION

Figure 1:
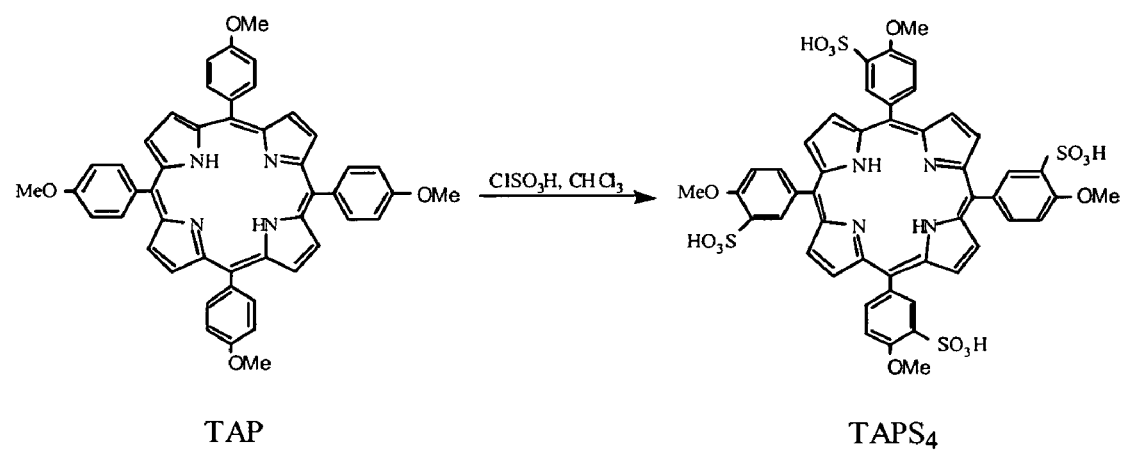
FIG. 1 illustrates the modification of cobalt tetraanisylporphyrin, a well-known catalytic chain transfer catalyst, into sulfonated tetraanisylporphyrin using chlorosulfonic acid.

Applicants specifically incorporate the entire content of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Applicants have found that catalytic chain transfer (CCT) catalyst removal requires no solvent addition if monomer polymerization is effectuated by specially designed catalysts. The catalysts are cobalt-complexed tetraphenyl porphyrin derivatives, which can be separated from a polymerization mixture by addition of a sorbent. The resulting oligomeric mixture can be then filtered by any method as is known to one of ordinary skill in the art to remove the sorbent containing absorbed CCT catalyst to yield a substantially to completely colorless polymer solution.

One aspect of the invention is a method of producing decolorized homo- and co-polymers comprising:
(a) polymerizing at least one monomer in the presence of a cobalt-complexed tetraphenyl porphyin derivative; and
(b) decolorizing the polymer produced by step (a) by exposing the polymer to a sorbent and, optionally, a solvent.

Preferred tetraphenyl porphyrin derivatives are represented by the formula:

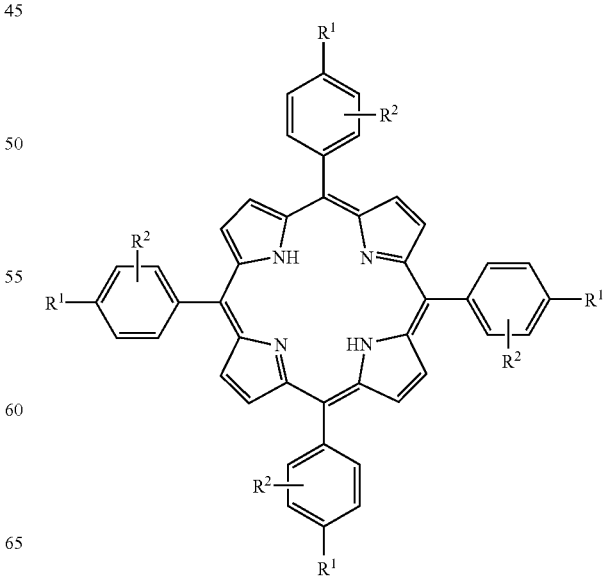

wherein each $R^1$ and $R^2$ is, independently, hydrogen, alkyl or branched alkyl $C_1$-$C_{12}$, hydroxyl, alkoxy, sulfonate, carboxylate, or phosphonate; provided that at least one $R^1$ or $R^2$ is sulfonate, carboxylate, or phosphonate. In a more preferred embodiment, each $R^1$ is methoxy and each $R^2$ is sulfonate.

Cobalt/porphyrin complexes can be formed by any method as is known to one of ordinary skill in the art or are commercially available from, for example, SigmaAldrich (St. Louis, Mo.).

Exemplifying production of a tetraphenyl porphyrin derivative, FIG. 1 shows the reaction of tetraanisylporphyrin (TAP) with chlorosulfonic acid in the presence of chloroform, producing sulfonated TAP ($TAPS_4$). Formation of a $TAPS_4$/cobalt complex can be effectuated by any method known to one of ordinary skill in the art, for example by reaction of $TAPS_4$ with cobalt acetate. While cobalt acetate is typically used, other cobalt compounds, for example cobalt chloride, can be used to form cobalt complexes.

Polymerization of monomers in the presence of cobalt chelates as catalytic chain transfers is well known. See, e.g., Gridnev, A., and Ittel, S. D., "Catalytic Chain Transfer in Free Radical Polymerization." Chem. Rev. 101:3611-60 (2001) and references therein.

By "polymerizing at least one monomer" is meant that a single monomer can be polymerized to form a homopolymer or two or more different monomers can be polymerized to form a co-polymer. Methacrylates are preferred monomers, but other monomers can be used as well, including, but not limited to, acrylates, styrene, alpha-methylstyrene and other substituted styrenes, maleates, itaconates, alpha-methylbutyroacetone, and chloroprene. Monomers can be polymerized in bulk or in a solvent. Typically, 10-2000 ppm of cobalt catalyst is added, and polymerization proceeds in regular way as is known to one of ordinary skill in the art of radical polymerization.

Preferred methacrylate monomers include butyl methacrylate, 2-hydroxyethyl methacrylate, and glycidylmethacrylate.

In the decolorization step, any polymer sorbent with ionizable groups can be used to remove the cobalt-complexed tetraphenyl porphyrin derivative from the reaction mixture. Non-limiting examples of useful sorbents include basic alumina, a basic exchange resin, an acidic exchange resin, and activated carbon. Preferably, the sorbent is basic alumina. Sorbents are added to the reaction mixture after the reaction is finished. After stirring for about 10 minutes to about 12 hours, preferably about 20 minutes to about four hours, the sorbents are filtered off. Optionally, sorbents can be used to filter reaction mixture through. Typically, sorbents are used at content of about 2 to about 40 weight percent of the reaction mixture. The exact amount of sorbent depends on the concentration of the cobalt catalyst in the reaction mixture. The greater the amount of cobalt catalyst used, the more sorbent is required to remove the catalyst from the reaction mixture.

Optionally, solvents can be used to aid in the removal of the cobalt complexed tetraphenyl porphyrin derivative from the reaction mixture, especially when the molecular weight of the polymer is high. The higher the MW of the polymer, the more solvent is required to maintain low viscosity during the decolorization process. Higher viscosities in the reaction mixture lead to longer decolorization processes. Exemplary solvents include methyl ethyl ketone, isopropanol, methanol, ethylacetate, butylacetate, toluene, xylene, and acetone. Preferred solvents are methyl ethyl ketone and isoproponal at a content of 80% or less.

Decolorized homopolymers and co-polymers produced as described herein are particularly useful in clearcoat coating compositions. Decolorized homopolymers and co-polymers can also be used, for example, in dental applications and in making hydrogels for contact lenses and other optical applications.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit, and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope, and concept of the invention as defined by the appended claims.

EXAMPLES

The present invention is further defined in the following Examples. It should be understood that these Examples, while indicating preferred embodiments of the invention, are given by way of illustration only. From the above discussion and these Examples, one skilled in the art can ascertain the preferred features of this invention, and without departing from the spirit and scope thereof, can make various changes and modifications of the invention to adapt it to various uses and conditions.

The meaning of abbreviations is as follows: "CCT" means catalytic chain transfer, "BMA" means butyl methacrylate, "PBMA" means polymerized butyl ethacrylate, "HEMA" means 2-hydroxyethyl methacrylate, "PHEMA" means polymerized 2-hydroxyethyl methacrylate, "MEK" means methyl ethyl ketone, "AIBN" means azobisisobutyronitrile, "BuAc" means n-butyl acetate, "DEMA" means dimethylaminoethyl methacrylate, and "TBA" means tetrabutyl ammonium.

Example 1

Preparation of Catalyst by Sulfonation of Tetraanisylporphyrin (TAP) Followed by Formation of Its Cobalt Complex 15 mg of TAP (0.02 mmol) was dissolved in chloroform (4 ml) and to this solution chlorosulfonic acid (135 μl) was added dropwise. The reaction mixture refluxed for two hours (see FIG. 1 for reaction). During this time, tetraanisylporphyrin tetrasulfate ($TAPS_4$) formed and precipitated out of the solution. The precipitate was separated by removal of the colorless solution and washed several times with chloroform and a minimal amount of 2-propanol to remove the excess acid. The green protonated form of $TAPS_4$ was neutralized with tetrabutylammonium hydroxide.

A mixture of $TAPS_4$ (1 equivalent) and cobalt acetate (1.2 equivalent) was heated in chloroform solution at 80° C. overnight. The solid product was obtained by evaporating the solvent. The solid was then dissolved in methanol to make a stock solution.

Example 2

Polymerization of BMA/HEMA in MEK

This example describes CCT polymerization of BMA-HEMA in 30% (wt) monomer concentration in MEK. To a glass vessel with vacuum adaptor, 3.9 ml BMA, 0.9 ml HEMA, 10.2 ml MEK, 225 µl [Co(TAPS$_4$)](TBA)$_4$ stock solution ([Co(II)]=4.0×10$^{-3}$ M), and 30.0 mg AIBN were added. The reaction mixture was degassed by 3 freeze-pump-thaw cycle, and heated at 333 K for 18 hours.

After the reaction finished, solvent and the unreacted monomer were removed by vacuum. The polymer product was dissolved in CDCl$_3$ to collect an $^1$HNMR spectrum. End-group analysis showed the M$_n$ was about 2000 g/mol.

The polymer was then dissolved in a different solvent to a concentration of 30% (wt) for decolorization study.

Example 3

General Decolorization Procedure 1 ml of 30% (wt) PBMA/PHEMA copolymer solution (M$_n$~2000) was stirred with 200 mg of a sorbent for 1 hour at room temperature. The mixture is filtered through a fine filter to remove the sorbent.

The polymer solution was colorless after the separation. Electronic spectra show that >95% of the cobalt porphyrin was removed.

The decolorization was conducted with the following sorbents: basic alumina, Amberlyst™ A-26(OH) (strong base anionic exchange resin (quaternary amine divinylbenzene/styrene copolymer, OH ion form) available from Rohm & Haas, Philadelphia, Pa.), and Amberjet™ 4200 (Cl) (strong base anionic exchange resin (quaternary amine divinylbenzene/styrene copolymer, Cl ion form) available from Rohm & Haas, Philadelphia, Pa.).

Results are shown in Tables 1 and 2.

TABLE 1

Decolorization of PBMA/PHEMA oligomer in isopropanol

| Sorbent | Amount of sorbent (%) | Time | Degree of Decolorization (%) |
|---|---|---|---|
| Activated Carbon | 5 | 10 min. | >95 |
|  | 0.5 | 30 min. | >95 |
|  | 0.1 | 2 days | ~50 |
| Basic alumina | 10 | 45 min. | 90 |
|  | 1.5 | 1 day | 90 |
|  | 0.5 | 2 days | 70 |
| Amberlyst™ A-26 | 2.5 | 5 hours | 80 |
| Amberjet™ 4200 | 5.5 | 1 day | 80 |

TABLE 2

Decolorization of PBMA/PHEMA oligomer in butanone

| Sorbent | Amount of sorbent (%) | Time | Degree of decolorization (%) |
|---|---|---|---|
| Activated Carbon | 0.5 | 80 min. | 90 |
| Basic alumina | 3.5 | 2 days | 90 |
| Amberlyst™ A-26 | 5.5 | 1 day | 80 |
| Amberjet™ 4200 | 5.5 | 2 days | 70 |

Example 4

Polymerization of BMA/HEMA in BuAc (Different Solvent)

This example describes CCT polymerization of BMA/HEMA with 30% (wt) monomer concentration in BuAc. To a glass vessel with vacuum adaptor, 1.3 ml BMA, 0.3 ml HEMA, 3.4 ml BuAc, 75 µl [Co(TAPS$_4$)](TBA)$_4$ stock solution ([Co(II)]=4.0×10$^{-3}$ M) and 10.0 mg AIBN were added. The reaction mixture was degassed by 3 freeze-pump-thaw cycle, and heated at 333 K for 18 hours. After the reaction finished, solvent and the unreacted monomer were removed by vacuum. The polymer product was dissolved in CDCl$_3$ to collect an $^1$HNMR spectrum. End-group analysis showed the M$_n$ was about 2000 g/mol.

The 30% (wt) polymer solution was then made in BuAc, and different absorbents were tested with 1 ml samples. The results are shown in Table 3.

TABLE 3

| Sorbent | Amount of sorbent (%) | Time | Degree of decolorization (%) |
|---|---|---|---|
| Amberlyst™ A-26 | 25 | 30 min. | 85 |
| Amberjet™ 4200 | 35 | 100 min. | 90 |
| Basic alumina | 40 | 4 hours | 90 |

Example 5

Polymerization of BMA/DEMA in MEK (Different Co-monomer)

This example describes CCT polymerization of BMA/DEMA with 34% (wt) monomer concentration in MEK. To a glass vessel with vacuum adaptor, 1.3 ml BMA, 0.3 ml DEMA, 3.4 ml MEK, 75 µl [Co(TAPS$_4$)](TBA)$_4$ stock solution ([Co(II)]=4.0×10$^{-3}$ M) and 10.0 mg AIBN were added. The reaction mixture was degassed by 3 freeze-pump-thaw cycle, and heated at 333 K for 18 hours. Solution of a copolymer was decolorized by 20% Amberlyst™ A-26 to a degree of 85%.

Comparative Example

Polymerization of BMA/HEMA in BuAc (Different Catalyst Is Used for Comparison)

Polymerization was conducted as described in Example 1, but with non-sulfonated cobalt porphyrin as a catalyst. The same molecular weight for the polymer was obtained as that described in Example 1. Decolorization, performed as described in Example 3 using Amberlyst™ A-26, failed; only marginal (~10%) decolorization was achieved.

We claim:

1. A method of producing decolorized homo- and co-polymers comprising:
    (a) polymerizing at least one monomer in the presence of a cobalt-complexed tetraphenyl porphyrin derivative; and
    (b) decolorizing the polymer produced by step (a) by exposing the polymer to a sorbent and, optionally, a solvent, wherein the cobalt-complexed tetraphenyl porphyrin derivative has the fomula:

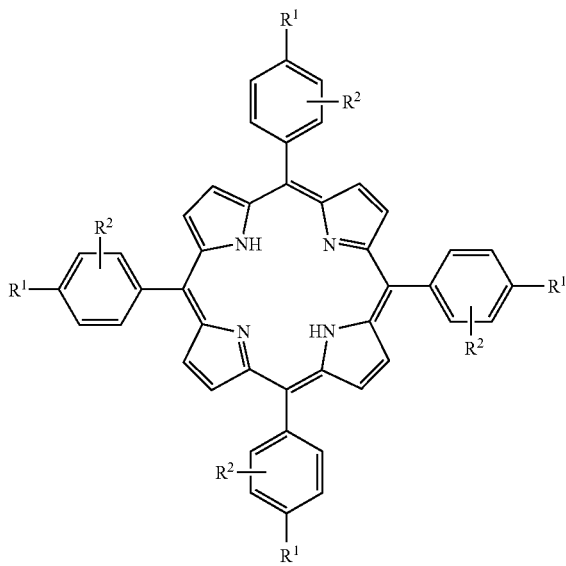

wherein each $R^1$ and $R^2$ is, independently, hydrogen, alkyl or branched alkyl $C_1$—$C_{12}$, hydroxyl, alkoxy, sulfonate, carboxylate, or phosphonate;

provided that at least one $R^1$ or $R^2$ is sulfonate, carboxylate, or phosphonate.

2. The method of claim 1, wherein each $R^1$ is methoxy and each $R^2$ is sulfonate.

3. The method of claim 1, wherein the at least one monomer is a methacrylate monomer, an acrylate monomer, a styrene monomer, a substituted styrene monomer, a maleate monomer, an itaconate monomer, an alpha-methylbutylroacetone monomer, or a chloroprene monomer.

4. The method of claim 3, wherein the methacrylate monomer is butyl methacrylate, 2-hydroxyethyl methacrylate, or glycidylmethacrylate.

5. The method of claim 1, wherein the sorbent is basic alumina, a basic exchange resin, an acidic exchange resin, or activated carbon.

6. The method of claim 1, wherein the solvent is methyl ethyl ketone, isopropanol, methanol, ethylacetate, butylacetate, toluene, xylene, or acetone.

7. The method of claim 1, wherein the decolorized polymer of step (b) has a degree of decolorization of greater than about 70%.

8. The method of claim 7, wherein the decolorized polymer of step (b) has a degree of decolorization of greater than about 80%.

9. The method of claim 8, wherein the decolorized polymer of step (b) has a degree of decolorization of greater than about 90%.

10. The method of claim 9, wherein the decolorized polymer of step (b) has a degree of decolorization of greater than about 95%.

* * * * *